United States Patent
Okuhata

(10) Patent No.: US 10,270,483 B2
(45) Date of Patent: *Apr. 23, 2019

(54) FM RECEPTION DEVICE, FM RECEPTION METHOD FOR RECEIVING FM SIGNALS

(71) Applicant: JVC KENWOOD Corporation, Yokohama-shi, Kanagawa (JP)

(72) Inventor: Yasuhide Okuhata, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 104 days.

This patent is subject to a terminal disclaimer.

(21) Appl. No.: 15/635,437

(22) Filed: Jun. 28, 2017

(65) Prior Publication Data

US 2017/0302318 A1    Oct. 19, 2017

Related U.S. Application Data

(63) Continuation of application No. PCT/JP2015/084432, filed on Dec. 8, 2015.

(30) Foreign Application Priority Data

Jan. 26, 2015 (JP) .................................. 2015-012457
Feb. 23, 2015 (JP) .................................. 2015-032459

(51) Int. Cl.
*H04B 1/10* (2006.01)
*H04B 1/30* (2006.01)
(Continued)

(52) U.S. Cl.
CPC ................. *H04B 1/30* (2013.01); *H04B 1/10* (2013.01); *H04L 27/0014* (2013.01);
(Continued)

(58) Field of Classification Search
CPC ...... H04B 1/30; H04B 1/10; H04B 2001/305; H04L 27/0014; H04L 27/14;
(Continued)

(56) References Cited

U.S. PATENT DOCUMENTS 4,944,025 A * 7/1990 Gehring .................. H03D 7/166
                                                      329/323
5,121,407 A * 6/1992 Partyka .................. H04B 1/707
                                                      375/141

FOREIGN PATENT DOCUMENTS

JP    H06-244754 A    9/1994
JP    H07-506951 A    7/1995
(Continued)

*Primary Examiner* — Michelle M Koeth
(74) *Attorney, Agent, or Firm* — Brundidge & Stanger, P.C.

(57) ABSTRACT

A quadrature detection unit subjects an FM signal to quadrature detection using a local oscillation signal and outputs a base band signal. A first correction unit and a second correction unit correct the base band signal using a DC offset correction value. A DC offset detection unit subjects the corrected base band signal to rectangular to polar conversion and derives the DC offset correction value such that amplitudes in a plurality of phase domains defined in an IQ plane approximate each other. An FM detection unit subjects the corrected base band signal to FM detection and generates a detection signal. An addition unit adds an offset to the detection signal. An AFC unit generates a control signal for controlling a frequency of a local oscillation signal based on the detection signal to which the offset is added.

2 Claims, 6 Drawing Sheets

(51) Int. Cl.
*H04L 27/00* (2006.01)
*H04L 27/14* (2006.01)
*H04L 27/16* (2006.01)
*H04L 27/152* (2006.01)

(52) U.S. Cl.
CPC ............ *H04L 27/14* (2013.01); *H04L 27/142* (2013.01); *H04L 27/1525* (2013.01); *H04L 27/16* (2013.01); *H04B 2001/305* (2013.01); *H04L 2027/0057* (2013.01); *H04L 2027/0065* (2013.01)

(58) Field of Classification Search
CPC ... H04L 27/142; H04L 27/1525; H04L 27/16; H04L 2027/0057; H04L 2027/0065
See application file for complete search history.

(56) References Cited

FOREIGN PATENT DOCUMENTS

| | | | |
|---|---|---|---|
| JP | H11-340863 | A | 12/1999 |
| JP | 2010-114508 | A | 5/2010 |
| JP | 2011-029717 | A | 2/2011 |
| JP | 2011029717 | A * | 2/2011 |

* cited by examiner

114

FM RECEPTION DEVICE, FM RECEPTION METHOD FOR RECEIVING FM SIGNALS

CROSS-REFERENCE TO RELATED APPLICATION

This application is based upon and claims the benefit of priority from the prior Japanese Patent Application No. 2015-012457, filed on Jan. 26, 2015, and Japanese Patent Application No. 2015-032459, filed on Feb. 23, 2015, the entire contents of which are incorporated herein by reference.

BACKGROUND

1. Field

The present invention relates to reception technologies and, more particularly, to FM reception devices and FM reception methods for receiving FM signals.

2. Description of the Related Art

Direct conversion Frequency Modulation (FM) reception devices convert an RF signal into a base band signal by quadrature detection and subsequently amplify the base band signal using an amplifier. An unnecessary DC component output by the amplifier results in a Direct Current (DC) offset and degrades reception properties of the reception device. In order to improve the situation, the I-phase base band signal and the Q-phase base band signal are turned into amplitude signals and phase signals by rectangular to polar conversion. The phase signals then are grouped in four phase domains. By deriving an average of amplitude signals in the respective phase domains, displacement of the base band signal from the origin is derived. The displacement is used as a DC offset correction value with which the I-phase base band signal and the Q-phase base band signal are corrected (see, for example, patent document 1).
Patent Document 1: JP2011-29717

If the received signal is unmodulated and the frequency thereof becomes identical to that of the local oscillation signal while a DC offset is being detected by utilizing the characteristic of the base band Lissajous waveform of a constant envelope modulation scheme, the I-phase base band signal and the Q-phase base band signal will remain at constant values. The phase signals obtained by subjecting these signals to rectangular to polar conversion will also remain at constant values and are invariably grouped in a single phase domain, making it impossible to distinguish between the received signal and the DC offset. This results in correction that causes the value of the received signal and the DC offset combined to become "0." As a consequence of this, the I-phase base band signal and the Q-phase base band signal as corrected will also be "0" so that an accurate detection signal cannot be obtained. If the modulation index of the received signal is small, the I-phase base band signal and the Q-phase base band signal will undergo small phase variation so that a similar phenomenon occurs.

SUMMARY

To address the above issue, an FM reception device according to an embodiment comprises: a local oscillator that outputs a local oscillation signal; a quadrature detection unit that subjects an FM signal to quadrature detection using the local oscillation signal output from the local oscillator and outputs an I-phase base band signal and a Q-phase base band signal; a correction unit that corrects the I-phase base band signal and the Q-phase base band signal output from the quadrature detection unit using a DC offset correction value; a DC offset detection unit that subjects the I-phase base band signal and the Q-phase base band signal corrected by the correction unit to rectangular to polar conversion and derives the DC offset correction value such that amplitudes in a plurality of phase domains defined in an IQ plane approximate each other; an FM detection unit that subjects the I-phase base band signal and the Q-phase base band signal corrected by the correction unit to FM detection and generates a detection signal; an addition unit that adds an offset to the detection signal generated in the FM detection unit; an AFC unit that generates a control signal for controlling a frequency of the local oscillation signal based on the detection signal to which the offset is added in the addition unit and feeds back the control signal to the local oscillator; a modulation frequency generation unit that generates a modulation signal of a predetermined frequency; a selection unit provided between the AFC unit and the local oscillator, the selection unit receiving the control signal from the AFC unit as a first control signal, receiving the modulation signal from the modulation frequency generation unit, selecting one of the first control signal and the modulation signal as a second control signal, and outputting the selected second control signal to the local oscillator; and a control unit that generates a selection signal indicating a signal that should be selected in the selection unit, based on the detection signal generated in the FM detection signal.

Another embodiment relates to an FM reception method. The method comprises: subjecting an FM signal to quadrature detection using a local oscillation signal output from a local oscillator and outputting an I-phase base band signal and a Q-phase base band signal; correcting the I-phase base band signal and the Q-phase base band signal using a DC offset correction value; subjecting the I-phase base band signal and the Q-phase base band signal corrected to rectangular to polar conversion and deriving the DC offset correction value such that amplitudes in a plurality of phase domains defined in an IQ plane approximate each other; subjecting the I-phase base band signal and the Q-phase base band signal corrected to FM detection and generating a detection signal; adding an offset to the detection signal generated; generating a control signal for controlling a frequency of the local oscillation signal based on the detection signal to which the offset is added; generating a modulation signal of a predetermined frequency; and selecting one of the control signal and the modulation signal according to a selection signal generated based on the detection signal and outputting the selected signal to the local oscillator.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

Embodiment 1

A summary will be given before describing the invention in specific details. Embodiment 1 relates to an FM reception device of direct conversion type. In FM reception devices, a DC offset is detected by utilizing the characteristic of a base band Lissajous waveform of a constant envelope modulation scheme in order to inhibit degradation reception properties due to a DC offset component. As described above, if the received signal is unmodulated and the frequency thereof is identical to the local oscillation signal, it will be impossible to distinguish between the received signal and the DC offset, with the result that the I-phase base band signal and the Q-phase base band signal as corrected will be "0." In order to prevent the occurrence of such a malfunction, the FM reception device according to the embodiment performs the following process.

The FM reception device subjects the I-phase base band signal and the Q-phase base band signal as corrected to FM detection and outputs a detection signal. An offset is added to the detection signal and the frequency of the local oscillation signal is controlled subsequently. Accordingly, a frequency error commensurate with the offset remains in the frequency of the received signal and the frequency of the local oscillation signal. Therefore, the phase signal is prevented from being locked to a constant value.

Figure 1:
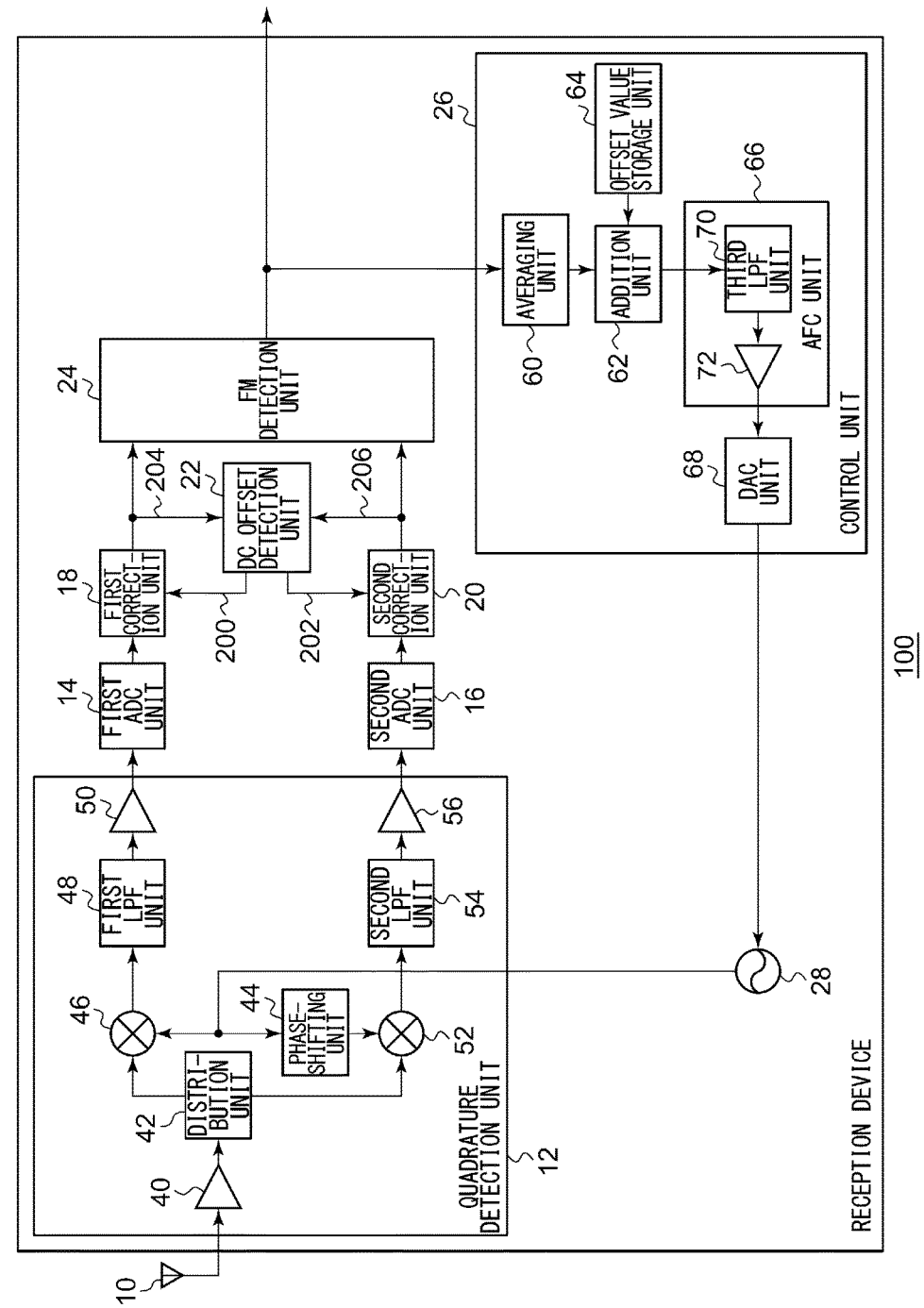
FIG. 1 shows features of a reception device according to Embodiment 1.

FIG. 1 shows features of a reception device 100 according to Embodiment 1. The reception device 100 includes an antenna 10, a quadrature detection unit 12, a first ADC unit 14, a second ADC unit 16, a first correction unit 18, a second correction unit 20, a DC offset detection unit 22, an FM detection unit 24, a control unit 26, and a local oscillator 28. The quadrature detection unit 12 includes a first amplifier unit 40, a distribution unit 42, a phase shifting unit 44, a first mixer 46, a first LPF unit 48, a second amplifier unit 50, a second mixer 52, a second LPF unit 54, and a third amplifier unit 56. The control unit 26 includes an averaging unit 60, an addition unit 62, an offset storage unit 64, an AFC unit 66, and a DAC unit 68. The AFC unit 66 includes a third LPF unit 70 and a fourth amplifier unit 72.

The antenna 10 receives a Radio Frequency (RF) signal from a transmission device (not shown). The RF signal is subjected to FM modulation. The antenna 10 outputs the received RF signal (hereinafter, also referred to as "received signal") to the first amplifier unit 40. The first amplifier unit 40 is a Low Noise Amplifier (LNA) and amplifiers the RF signal from the antenna 10. The first amplifier unit 40 outputs the amplified RF signal to the distribution unit 42. The distribution unit 42 splits the RF signal from the first amplifier unit 40 into signals of two systems. The distribution unit 42 outputs the split RF signals to the first mixer 46 and the second mixer 52.

The local oscillator 28 regulates the frequency of the local oscillation signal in accordance with a control signal from the DAC unit 68 and outputs the local oscillation signal with the regulated frequency to the phase shifting unit 44 and the first mixer 46. The local oscillator 28 regulates the frequency of the local oscillation signal such that the higher the voltage of the control signal, the higher the frequency. The phase shifting unit 44 shifts the phase of the local oscillation signal from the local oscillator 28 by 90 degrees. The phase shifting unit 44 outputs the local oscillation signal with the shifted phase to the second mixer 52.

The first mixer 46 generates the I-phase base band signal (hereinafter, "I-signal") by multiplying the RF signal from the distribution unit 42 by the local oscillation signal from the local oscillator 28. The first mixer 46 outputs the I-signal to the first LPF unit 48. The second mixer 52 generates the Q-phase base band signal (hereinafter, "Q-signal") by multiplying the RF signal from the distribution unit 42 by the local oscillation signal from the phase shifting unit 44. The second mixer 52 outputs the Q-signal to the second LPF unit 54.

Of the I-signals from the first mixer 46, the first LPF unit 48 eliminates signals of a frequency equal to or higher than a cut-off frequency, thereby limiting the band. The first LPF unit 48 outputs the I-signal comprised of low-frequency components (hereinafter, also referred to as "I-signal") to the second amplifier unit 50. Of the Q-signals from the second mixer 52, the second LPF unit 54 eliminates signals of a frequency equal to or higher than a cut-off frequency, thereby limiting the band. The second LPF unit 54 outputs the Q-signal comprised of low-frequency components (hereinafter, also referred to as "Q-signal") to the third amplifier unit 56.

The second amplifier unit 50 amplifiers the I-signal from the first LPF unit 48 and the third amplifier unit 56 amplifiers the Q-signal from the second LPF unit 54. The I-signal output from the second amplifier unit 50 contains unnecessary direct current components and the Q-signal output from the third amplifier unit 56 also contains unnecessary direct current components. As a result, a DC offset voltage is added to these signals. As described above, the quadrature detection unit 12 subjects the RF signal to quadrature detection. The quadrature detection unit 12 is comprised of an analog device. For example, the quadrature detection unit 12 is comprised of one chip.

The first ADC unit 14 subjects the I-signal from the second amplifier unit 50 to analog-to-digital conversion. The first ADC unit 14 outputs the digitized I-signal (hereinafter, also referred to as "I-signal") to the first correction unit 18. The second ADC unit 16 subjects the Q-signal from the third amplifier unit 56 to analog-to-digital conversion. The second ADC unit 16 outputs the digitized Q-signal (hereinafter, also referred to as "Q-signal") to the second correction unit 20.

The first correction unit 18 receives the I-signal output from the first ADC unit 14 and also receives the I-phase offset correction value 200 from the DC offset detection unit 22. The first correction unit 18 corrects the I-signal by the I-phase offset correction value 200 by adding the I-signal and the I-phase offset correction value 200. The first correction unit 18 outputs a corrected I-signal 204 to the DC offset detection unit 22 and the FM detection unit 24.

The second correction unit 20 receives the Q-signal output from the second ADC unit 16 and also receives the Q-phase offset correction value 202 from the DC offset detection unit 22. The second correction unit 20 corrects the Q-signal by the Q-phase offset correction value 202 by adding the Q-signal and the Q-phase offset correction value 202. The second correction unit 20 outputs a corrected Q-signal 206 to the DC offset detection unit 22 and the FM detection unit 24.

The DC offset detection unit 22 receives the corrected I-signal 204 from the first correction unit 18 and the corrected Q-signal 206 from the second correction unit 20 and estimates the DC offset voltage added to these signals. The DC offset detection unit 22 generates the I-phase offset correction value 200 and the Q-phase offset correction value 202 for reducing the DC offset voltage. The DC offset detection unit 22 outputs the I-phase offset correction value 200 to the first correction unit 18 and outputs the Q-phase offset correction value 202 to the second correction unit 20. The features of the DC offset detection unit 22 will be described by using FIG. 2.

Figure 2:
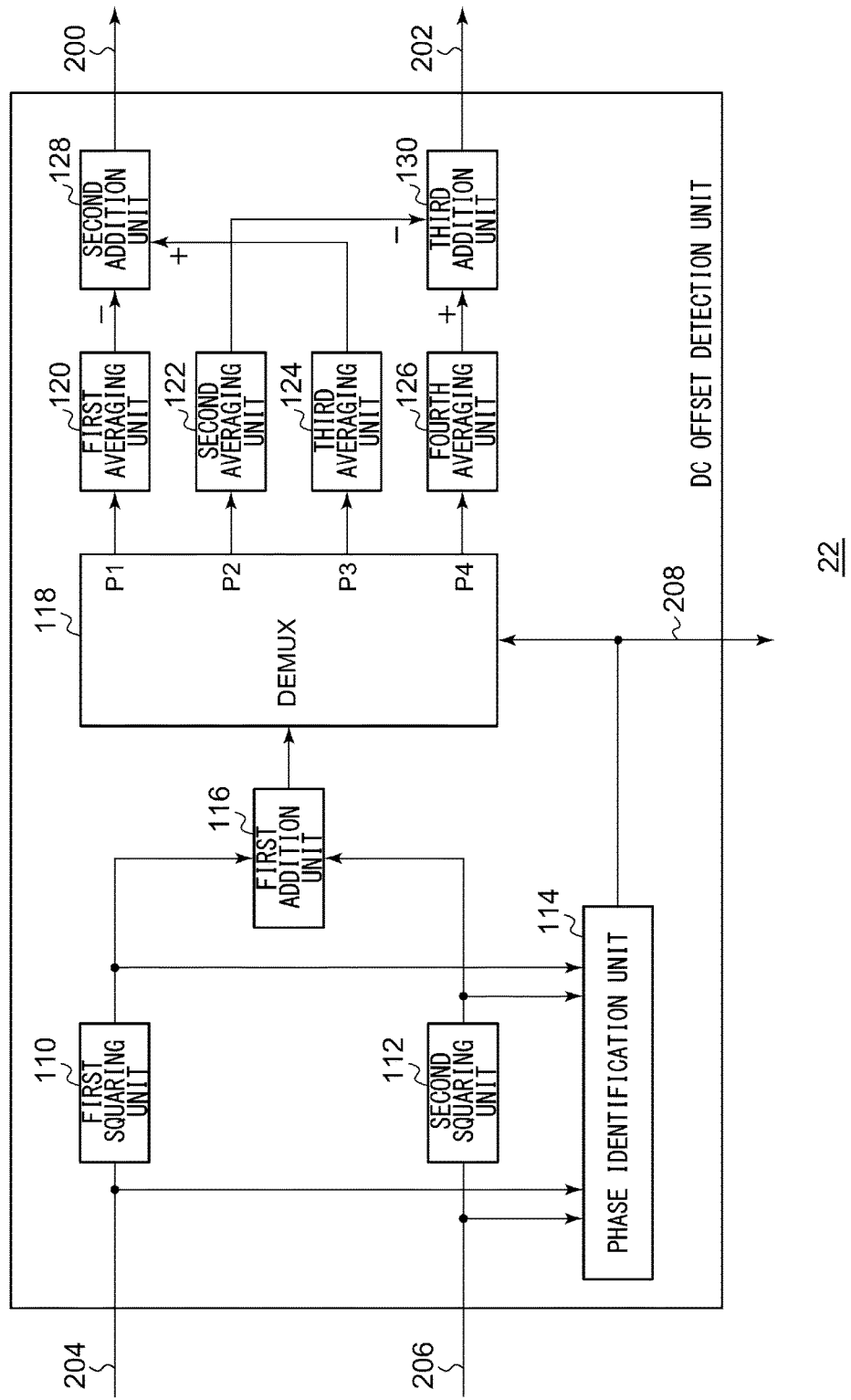
FIG. 2 shows features of the DC offset detection unit of FIG. 1.

FIG. 2 shows features of the DC offset detection unit 22. The DC offset detection unit 22 includes a first squaring unit 110, a second squaring unit 112, a phase identification unit 114, a first addition unit 116, a DEMUX 118, a first averaging unit 120, a second averaging unit 122, a third averaging unit 124, a fourth averaging unit 126, a second addition unit 128, and a third addition unit 130.

The first squaring unit 110 receives the corrected I-signal 204 and derives a square value of the received signal. The first squaring unit 110 outputs the square value of the corrected I-signal 204 to the phase identification unit 114 and the first addition unit 116. The second squaring unit 112 receives the corrected Q-signal 206 and derives a square value of the received signal. The second squaring unit 112 outputs the square value of the corrected Q-signal 206 to the phase identification unit 114 and the first addition unit 116.

The first addition unit 116 receives the square value of the corrected I-signal 204 from the first squaring unit 110 and receives the square value of the corrected Q-signal 206 from the second squaring unit 112. The first addition unit 116 adds the square value of the corrected I-signal 204 and the square value of the corrected Q-signal 206. The result of addition represents a power value P of the corrected I-signal 204 and the corrected Q-signal 206. The power value P is a square value of the amplitude signal resulting from subjecting the corrected I-signal 204 and the corrected Q-signal 206 to rectangular to polar conversion. For this reason, the process performed by the first squaring unit 110, the second squaring unit 112, and the first addition unit 116 represents a process of deriving an amplitude signal. The first addition unit 116 outputs the power value P to the DEMUX 118.

Figure 3:
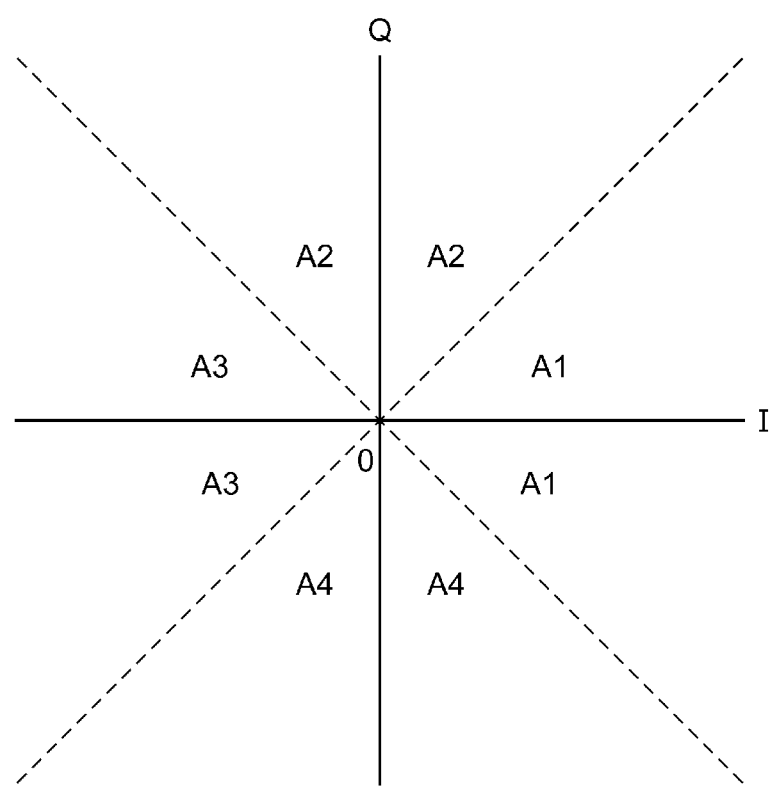
FIG. 3 shows a plurality of domains defined in the phase identification unit of FIG. 2.

The phase identification unit 114 receives the corrected I-signal 204 and the corrected Q-signal 206, receives the square value of the corrected I-signal 204 from the first squaring unit 110, and receives the square value of the corrected Q-signal 206 from the second squaring unit 112. The phase identification unit 114 identifies the phase domain based on these values. FIG. 3 will be used to explain the process. FIG. 3 shows a plurality of domains defined in the phase identification unit 114. The figure shows an IQ plane. The horizontal axis represents the I axis and the vertical axis represents the Q axis. As shown in the figure, four phase domains from A1 to A4 are defined so as not to overlap each other. The phase domain A1 is a range of $\pi/2$ from $\pi/4$ to $\pi/4$, the phase domain A2 is a range of $\pi/2$ from $\pi/4$ to $3\pi/4$, the phase domain A3 is a range of $\pi/2$ from $3\pi/4$ to $5\pi/4$, and the phase domain A4 is a range of $\pi/2$ from $5\pi/4$ to $7\pi/4$.

For clarity of the notation, the corrected I-signal 204 will be denoted by "I," the corrected Q-signal 206 will be denoted by "Q," the square value of the corrected I-signal 204 will be denoted by "I2," and the square value of the corrected Q-signal 206 will be denoted by "Q2" in the following description. The phase identification unit 114 groups the signals in the four phase domains A1, A2, A3, and A4 in accordance with the following conditions for identification.

| | |
|---|---|
| $I^2 \geq Q^2, I \geq 0$ | A1 |
| $I^2 < Q^2, Q \geq 0$ | A2 |
| $I^2 \geq Q^2, I < 0$ | A3 |
| $I^2 < Q^2, Q < 0$ | A4 |

The phase identification unit 114 outputs the identified phase domain as a phase domain signal 208. If the identified phase domain varies in succession such that A1, A2, A3, A3, A4, A1, A2, ... with time, for example, the phase domain signal 208 also varies in succession such that A1, A2, A3, A4, A1, A2, .... The process performed by the phase identification unit 114 represents a process of deriving a phase signal obtained by subjecting the corrected I-signal 204 and the corrected Q-signal 206 to rectangular to polar conversion. Reference is made back to FIG. 2.

The DEMUX 118 receives the power value P from the first addition unit 116 and the phase domain signal 208 from the phase identification unit 114 in succession. The power value P and the phase domain signal 208 are synchronized. The DEMUX 118 outputs the power value P as one of power values P1 through P4 in accordance with the phase domain indicated in the phase domain signal 208. To describe it more specifically, the DEMUX 118 outputs the power value P1 if the phase domain A1 is indicated, outputs the power value P2 if the phase domain A2 is indicated, outputs the power value P3 if the phase domain A3 is indicated, and outputs the power value P4 if the phase domain A4 is indicated.

The first averaging unit 120 calculates an average power P1 of the input power value P1 over a predetermined period of time and outputs the average power P1 to the second addition unit 128. For example, a moving average may be used. The second averaging unit 122 calculates an average power P2 of the input power value P2 over a predetermined period of time and outputs the average power P2 to the third addition unit 130. The third averaging unit 124 calculates an average power P3 of the input power value P3 over a predetermined period of time and outputs the average power P3 to the second addition unit 128. The fourth averaging unit 126 calculates an average power P4 of the input power value P4 over a predetermined period of time and outputs the average power P4 to the third addition unit 130. The process in the first averaging unit 120 through the fourth averaging unit 126 represents deriving an average of amplitude signals for the respective phase domains.

The second addition unit 128 receives the average power P1 from the first averaging unit 120 and receives the average power P3 from the third averaging unit 124. The second addition unit 128 subtracts the average power P1 from the average power P3. The second addition unit 128 outputs the result of subtraction as the I-phase offset correction value 200. The third addition unit 130 receives the average power P2 from the second averaging unit 122 and receives the average power P4 from the fourth averaging unit 126. The third addition unit 130 subtracts the average power P2 from the average power P4. The third addition unit 130 outputs the result of subtraction as the Q-phase offset correction value 202. Thus, the DC offset detection unit 22 determines the displacement of the corrected I-signal 204 and the corrected Q-signal 206 from the origin by referring to the average of the power values (i.e., the values corresponding to the amplitude signals) in the respective phase domains. The DC offset detection unit 22 outputs the displacement as the I-phase offset correction value 200 and the Q-phase offset correction value 202. This corresponds to deriving the I-phase offset correction value 200 and the Q-phase offset correction value 202 such that the amplitudes in the plurality of phase domains defined in the IQ plane approximate each other. Reference is made back to FIG. 1.

The FM detection unit 24 subjects the corrected I-signal 204 and the corrected Q-signal 206, i.e., the base band signal with the corrected DC offset, to FM detection. For example, Arctan detection is performed as FM detection. In Arctan detection, an angle formed by two sides of a triangle representing the corrected I-signal 204 and the corrected Q-signal 206 is derived. Angular variation per unit time represents an angular velocity, i.e., frequency. Therefore, demodulation from FM modulation is enabled. The FM detection unit 24 outputs a detection signal resulting from FM detection. The output detection signal represents a sound signal.

The averaging unit 60 receives the detection signal from the FM detection unit 24. The averaging unit 60 averages the detection signal over a predetermined period of time and outputs an average voltage to the addition unit 62. For example, a moving average is used. The average voltage is proportional to a frequency difference between the central frequency of the received signal the output frequency of the local oscillation signal. Therefore, if the average voltage is "0," it means that the frequencies are identical. As described above, if the received signal is unmodulated and these frequencies are identical, it will be impossible to distinguish between the signal component and the DC offset voltage because the corrected I-signal 204 and the corrected Q-signal 206 remain constant. As a result, the DC offset detection unit 22 ends up outputting the I-phase offset correction value 200 and the Q-phase offset correction value 202 that cause the corrected I-signal 204 and the corrected Q-signal 206 to be "0." In order to address this situation, the following process is performed.

The offset storage unit 64 stores a predefined offset value. The addition unit 62 receives the offset value from the offset storage unit 64 and receives the average voltage from the averaging unit 60. The addition unit 62 adds the offset value to the average voltage and outputs the result to the third LPF unit 70. Absent the addition of the offset value in the addition unit 62, the AFC unit 66 controls the central frequency of the received signal and the frequency of the local oscillation signal to be identical. Because the addition unit 62 adds a certain offset value, the local oscillation signal has a frequency offset commensurate with the offset value. The corrected I-signal 204 and the corrected Q-signal 206 are rotated due to the frequency offset and are prevented from remaining constant.

The third LPF unit 70 receives an average voltage to which an offset value is added (hereinafter, also referred to as "average voltage") from the addition unit 62. The third LPF unit 70 performs low pass filtering on the average voltage. The third LPF unit 70 outputs the average voltage subjected to the low pass filtering (hereinafter, also referred to as "average voltage") to the fourth amplifier unit 72. The fourth amplifier unit 72 generates a control signal by amplifying the average voltage from the third LPF unit 70. Amplification in the fourth amplifier unit 72 determines the gain of an AFC loop.

The DAC unit 68 subjects the control signal from the fourth amplifier unit 72 to digital to analog conversion and outputs the analog control signal (hereinafter, also referred to as "control signal") to the local oscillator 28. Thus, the AFC unit 66 generates a control signal for controlling the frequency of the local oscillation signal by referring to the average voltage to which the offset is added by the addition unit 62, and feeds back the control signal to the local oscillator 28. Addition of the offset represents controlling the frequency of the local oscillation signal output from the local oscillator 28 so that the phase component resulting from rectangular to polar conversion in the DC offset detection unit 22 is rotated.

The features are implemented in hardware such as a CPU, a memory, or other LSI's of an arbitrary computer, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

According to the embodiment, the frequency of the local oscillation signal is controlled so that the phase component of the signal input to the DC offset detection unit is rotated. Therefore, the phase component of the signal input to the DC offset detection unit is caused to vary even if the received signal is unmodulated and the frequency thereof is identical to that of the local oscillation signal. Since the phase component of the signal input to the DC offset detection unit is caused to vary, the DC offset detection unit can correct only the DC offset voltage. Since the DC offset detection unit corrects only the DC offset voltage even if the received signal is unmodulated and the frequency thereof is identical to that of the local oscillation signal, a malfunction is prevented from occurring when correcting an unnecessary DC offset component superimposed on the base band signal. Even if the received signal is unmodulated and the frequency thereof is identical to that of the local oscillation signal, AFC is effected so that the frequencies are not identical so that the DC offset detection unit can only correct the DC offset voltage. Since it is only required to add an offset value to the detection signal, the process is simplified. Since the DC offset voltage is corrected, the reception properties are prevented from being degraded.

Embodiment 2

A description will now be given of Example 2. Like Embodiment 1, Embodiment 2 relates to an FM reception device of direct conversion type. In Embodiment 1, an offset is added to the detection signal and the frequency of the local oscillation signal is controlled subsequently in order to inhibit the occurrence of a malfunction when detecting a DC offset. Meanwhile, Embodiment 2 involves monitoring the distribution of appearance of corrected I-phase base band signals and corrected Q-phase base band signals in the respective phase domains in order to inhibit the occurrence of a malfunction when detecting a DC offset. If the distribution is uneven, the frequency of the local oscillation signal is caused to vary. As a result, the phase signal is prevented from being locked to a constant value.

Figure 4:
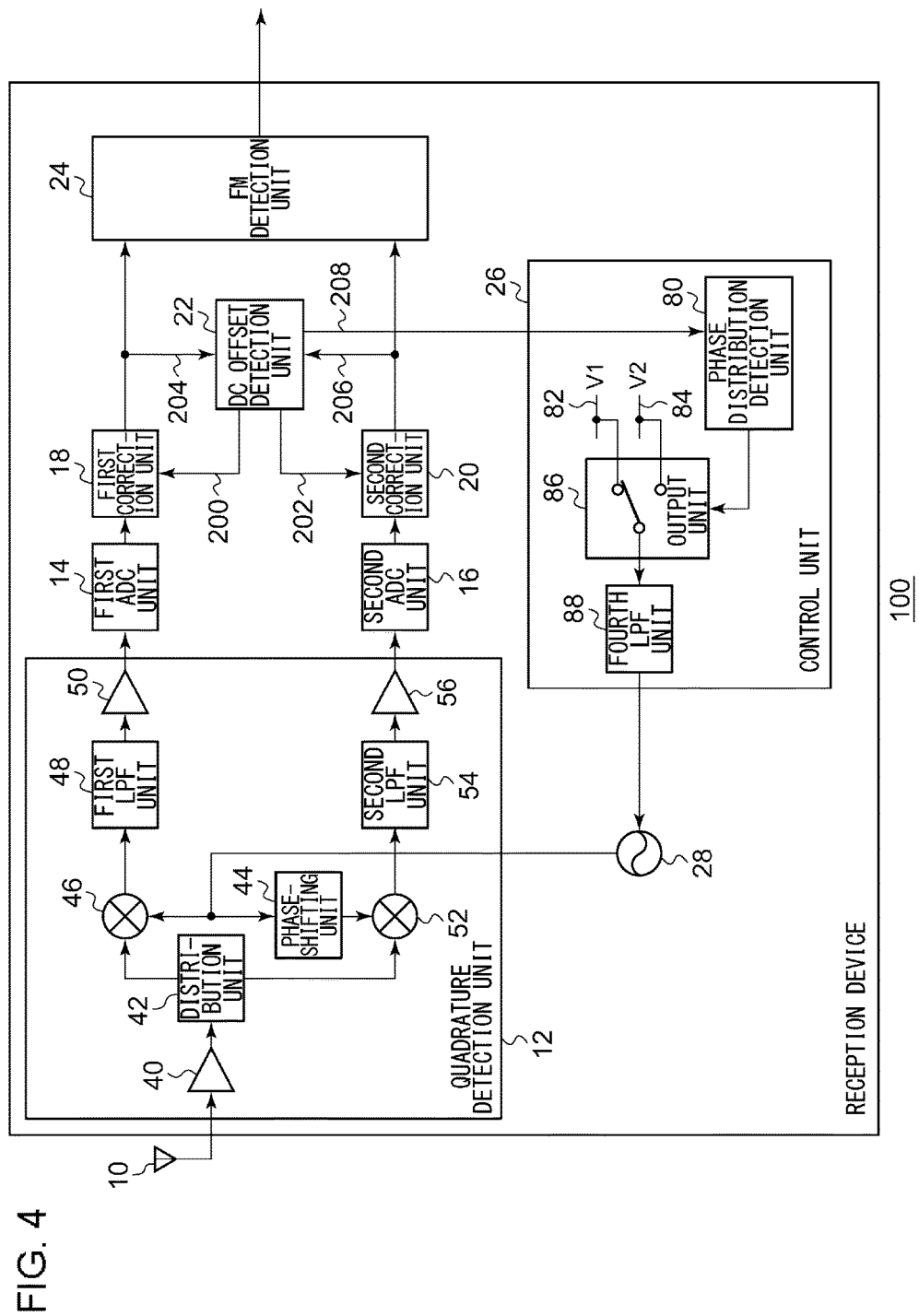
FIG. 4 shows features of the reception device according to Embodiment 2.

FIG. 4 shows features of the reception device 100 according to Embodiment 2. The reception device 100 includes an antenna 10, a quadrature detection unit 12, a first ADC unit 14, a second ADC unit 16, a first correction unit 18, a second correction unit 20, a DC offset detection unit 22, an FM detection unit 24, a control unit 26, and a local oscillator 28. The quadrature detection unit 12 is as shown in FIG. 1. The control unit 26 includes a phase distribution detection unit 80, a first power supply unit 82, a second power supply unit 84, an output unit 86, and a fourth LPF unit 88. The description here concerns a difference from FIG. 1, and, in particular, the control unit 26.

The phase distribution detection unit 80 receives a phase domain signal 208 from the DC offset detection unit 22. As described above, the phase domain signal 208 indicates the phase domain identified by the phase identification unit 114. If the corrected I-signal 204 and the corrected Q-signal 206 are not locked to a constant value, the phase component thereof varies so that the phase domains occur evenly in the phase domain signal 208 over a predetermined period of time. Meanwhile, if the received signal is unmodulated and the frequency thereof is identical to that of the local oscillation signal, the corrected I-signal 204 and the corrected Q-signal 206 will be locked to a constant value so that the same phase domain continues in the phase domain signal 208. In other words, phase domains appear unevenly in the phase domain signal 208 over a predetermined period of time.

Accordingly, the phase distribution detection unit 80 counts the frequency of appearance of the phase domains indicated by the phase domain signal 208 over a predetermined period of time. The phase distribution detection unit 80 compares the counts for the respective phase domains after the predetermined period of time and derives the evenness of appearance of phase components derived from rectangular to polar conversion in the plurality of phase domains. For example, if the difference between the maximum count and the minimum count is less than a threshold, the phase distribution detection unit 80 determines that the distribution is even. If not, the distribution is determined to be uneven. In this process, the difference may be divided by a sum of all counts before making a comparison. Alternatively, the phase distribution detection unit 80 may derive a statistical value indicating dispersion such as variance and standard deviation, on the basis of the counts. The phase distribution detection unit 80 may then determine that the distribution is even if the statistical value is smaller than a threshold value and determine that the distribution is uneven if the threshold value is equal to or larger than the threshold value. If it is determined that the distribution is even, the phase distribution detection unit 80 outputs a maintenance signal to the output unit 86. If it is determined that the distribution is uneven, the phase distribution detection unit 80 outputs a switch signal to the output unit 86.

The first power supply unit 82 supplies a predetermined first voltage to the output unit 86. The second power supply unit 84 supplies a second voltage different in value from the first voltage supplied from the first power supply unit. The second voltage may be higher or lower than the first voltage.

The output unit 86 receives the first voltage from the first power supply unit 82 and receives the second voltage from the second power supply unit 84. The output unit 86 also receives the maintenance signal or the switch signal from the phase distribution detection unit 80. The output unit 86 is configured as a switch and selects and outputs one of the first voltage and the second voltage in response to the maintenance signal or the switch signal. First, the output unit 86 selects an arbitrary one of the first voltage and the second voltage. For example, the output unit 86 selects the first voltage. When the maintenance signal is received in this state, the output unit 86 continues to select the first voltage so that the first voltage continues to be output to the fourth LPF unit 88. In other words, the maintenance signal is a signal for maintaining the selection in the output unit 86.

Meanwhile, when the switch signal is received, the output unit 86 switches from the selection of the first voltage to the selection of the second voltage so that the second voltage is output to the fourth LPF unit 88. In other words, the switch signal is a signal to cause the output unit 86 to switch the selection. Therefore, when the switch signal is received while the second voltage is being selected, the output unit 86 switches from the selection of the second voltage to the selection of the first voltage. Thus, the output unit 86 switches from the selection of one of the first voltage supplied from the first power supply unit 82 and the second voltage supplied from the second power supply unit 84 when the evenness derived in the phase distribution detection unit 80 is lower than a threshold value and the distribution is indicated to be uneven. The output unit 86 outputs the first voltage or the second voltage to the fourth LPF unit 88.

The fourth LPF unit 88 receives the first voltage or the second voltage from the output unit 86. The fourth LPF unit 88 performs low pass filtering on the first voltage or the second voltage. The fourth LPF unit 88 outputs the control signal resulting from the low pass filtering to the local oscillator 28. As described above, the control signal controls the frequency of the local oscillation signal output from the local oscillator 28. As a result, the voltage of the control signal varies in response to the switching between the first voltage and the second voltage so that the oscillation frequency of the local oscillation signal varies accordingly. This prevents the corrected I-signal 204 and the corrected Q-signal 206 input to the DC offset detection unit 22 from being locked to a constant value, allowing the DC offset detection unit 22 to correct only the DC offset voltage.

As described above, the output unit 86 and the fourth LPF unit 88 change the value of the control signal for controlling the frequency of the local oscillation signal when the evenness derived in the phase distribution detection unit 80 is lower than the threshold value and feeds back the control signal to the local oscillator 28. Therefore, the control unit 26 according to Embodiment 2, as well as in Embodiment 1, controls the frequency of the local oscillation signal output from the local oscillator 28 so as to rotate the phase component resulting from rectangular to polar conversion in the DC offset detection unit 22.

While the antenna 10 is not receiving RF signals, the I-signal output from the first ADC unit 14 and the Q-signal output from the second ADC unit only contain the DC offset voltage. Therefore, the phase component resulting from rectangular to polar conversion in the DC offset detection unit 22 remains at the same value. All this while, the oscillation frequency of the local oscillation signal output from the local oscillator 28 changes periodically but the DC offset voltage does not change. Therefore, the DC offset detection unit 22 can operate to cancel the DC offset voltage.

According to this embodiment, the value of the control signal is changed when the distribution of phases becomes uneven. Therefore, the frequency of the local oscillation signal can be changed accordingly. The change in the frequency of the local oscillation signal makes it different from the frequency of the received signal even if the frequencies had been identical before the change. Since frequency of the local oscillation signal is different from the frequency of the received signal, the DC offset detection unit can correct only the DC offset voltage. Since the DC offset detection unit corrects only the DC offset voltage even if the received signal is unmodulated and the frequency thereof is identical to that of the local oscillation signal, a malfunction is prevented from occurring when correcting an unnecessary DC offset component superimposed on the base band signal. Since the selection of one of the first voltage and the second voltage is switched when the evenness of phase components is lower than a threshold value, the process is simplified.

Embodiment 3

A description will now be given of Example 3. Like Embodiment 1, Embodiment 3 relates to an FM reception device of direct conversion type. In Embodiment 1, an offset is added to the detection signal and the frequency of the local oscillation signal is controlled subsequently in order to inhibit the occurrence of a malfunction when detecting a DC offset. AFC can operate only after the received signal is subjected to FM detection. Meanwhile, unlike AFC control, FM modulation of the local oscillation signal is possible even before the received signal is subjected to FM detection but degrades C/N of the local oscillation signal. This tends to result in degradation in reception properties such as reciprocal mixing and poorer S/N. Embodiment 3 combines AFC control and FM modulation. The process is switched depending on whether the system is in a signal detection stage or in a subsequent stage. Before a signal is detected, the local oscillation signal is subject to FM modulation. After a signal is detected, AFC is performed.

Figure 5:
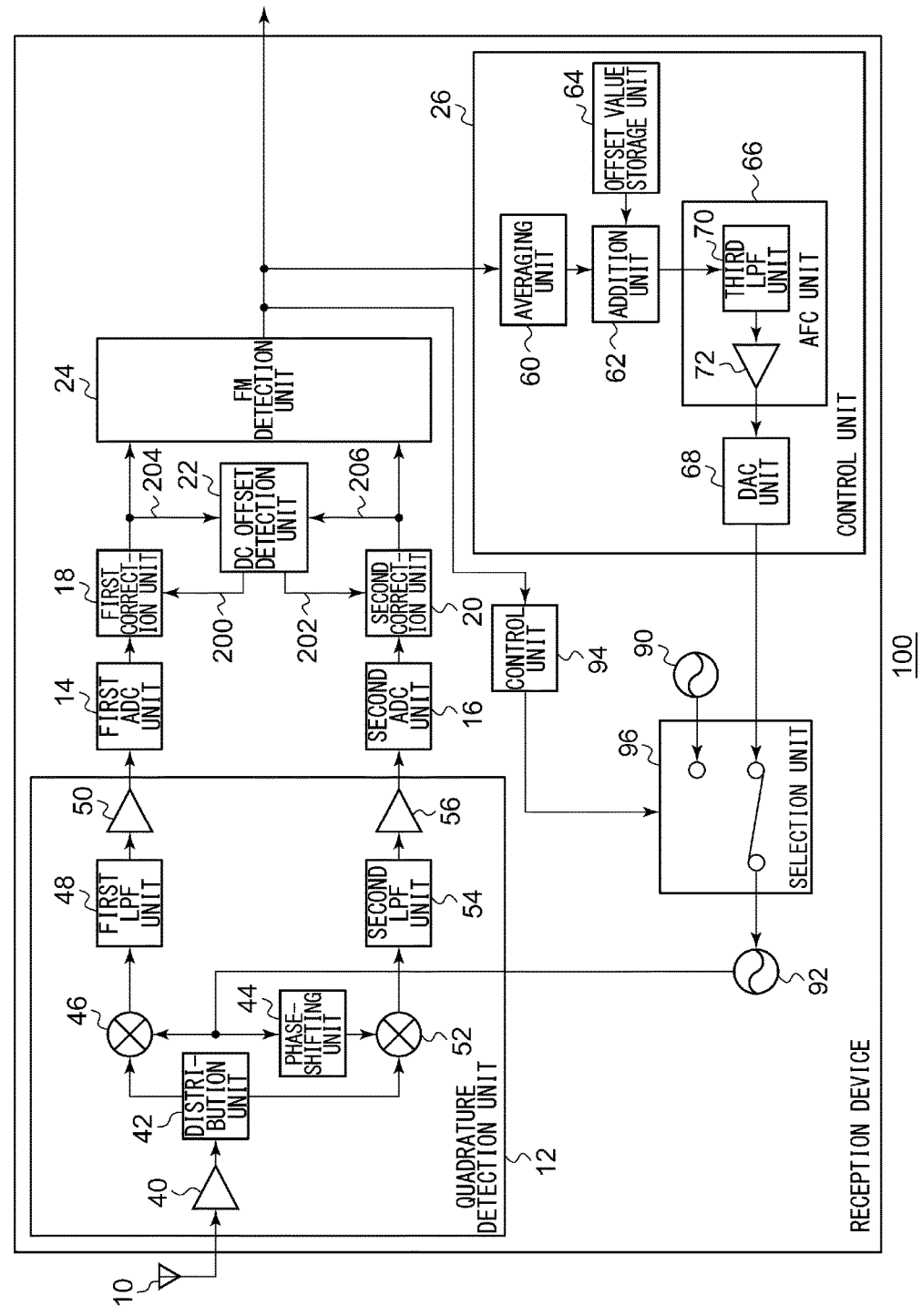
FIG. 5 shows features of the reception device according to Embodiment 3.

FIG. 5 shows features of the reception device 100 according to Embodiment 3. In addition to the features of FIG. 1, a first local oscillator 90, a second local oscillator 92, a control unit 94, and a selection unit 96 are added in the reception device 100. The following description concerns a difference from the description above.

The first local oscillator 90 is a modulation frequency generation unit for generating a modulation signal of a predetermined frequency. The modulation signal of a predetermined frequency will be referred to as a first local oscillation signal. The selection unit 96 receives a first control signal from the DAC unit 68 and a first local oscillation signal from the first local oscillator 90. The first control signal corresponds to the control signal in Embodiment 1. The selection unit 96 also receives a selection signal from the control unit 94. The selection unit 96 selects one of the first control signal and the first local oscillation signal as a second control signal, in accordance with the selection signal. The selection unit 96 outputs the selected second control signal to the second local oscillator 92. The second local oscillator 92 corresponds to the local oscillator 28 of Embodiment 1. The second local oscillator 92 regulates the frequency of the second local oscillation signal in accordance with the second control signal from the selection unit 96 and outputs the second local oscillation signal with the regulated frequency to the first mixer 46 and the phase shifting unit 44.

The control unit 94 receives the detection signal from the FM detection unit 24. The control unit 94 generates the selection signal based on the detection signal. The selection signal indicates a signal that should be selected in the control unit 94, i.e., the first control signal or the first local oscillation signal. The control unit 94 represents monitoring whether an RF signal is received in the antenna 10, i.e., monitoring whether a carrier is received. For example, a noise squelch circuit is used. The noise squelch circuit detects noise components in a selected band not lower than the demodulation band for the detection signal output from the FM detection unit 24. If the noise is below a predetermined level, the noise squelch circuit determines that the noise is suppressed by a carrier and the RF signal is received. If the noise is at the predetermined level of higher, the noise squelch circuit determines that the noise is not suppressed and the RF signal is not received.

The control unit 94 generates a selection signal for causing the first local oscillation signal to be selected if the RF signal is not received and outputs the selection signal to the selection unit 96. The selection unit 96 selects the first local oscillation signal based on the selection signal and feeds the second control signal associated with the selection to the second local oscillator 92. As a result the second local oscillator 92 outputs the second local oscillation signal subjected to FM modulation. Even if an unmodulated signal having the same frequency as that of the second local oscillation signal is received in this state, the I-signal and the Q-signal are prevented from being locked to a constant value.

When an RF signal is received in this situation, the control unit 94 detects the RF signal. The oscillation frequency of the first local oscillation signal is superimposed on the detection signal output from the FM detection unit 24. If the oscillation signal of the first local oscillation signal is configured to be within the demodulation band, the first local oscillation signal is output as a detection signal and so is subjected to demodulation.

Therefore, when the reception of an RF signal is detected, the control unit 94 generates a selection signal for causing the first control signal to be selected and outputs the selection signal to the selection unit 96. The selection unit 96 selects the first control signal based on the selection signal and feeds the second control signal to the second local oscillator 92. As a result, the second local oscillator 92 outputs the second local oscillation signal subjected to AFC control. This prevents unnecessary signals from being contained in the detection signal even when the oscillation frequency of the second local oscillation signal is within the demodulation band.

In essence, the control unit 94 varies the frequency of the second oscillation signal by generating the selection signal for selecting the first local oscillation signal when a carrier is not detected. Meanwhile, the control unit 94 stops modulating the frequency of the second local oscillation signal by switching to the selection signal for selecting the first control signal when a carrier is detected.

Figure 6:
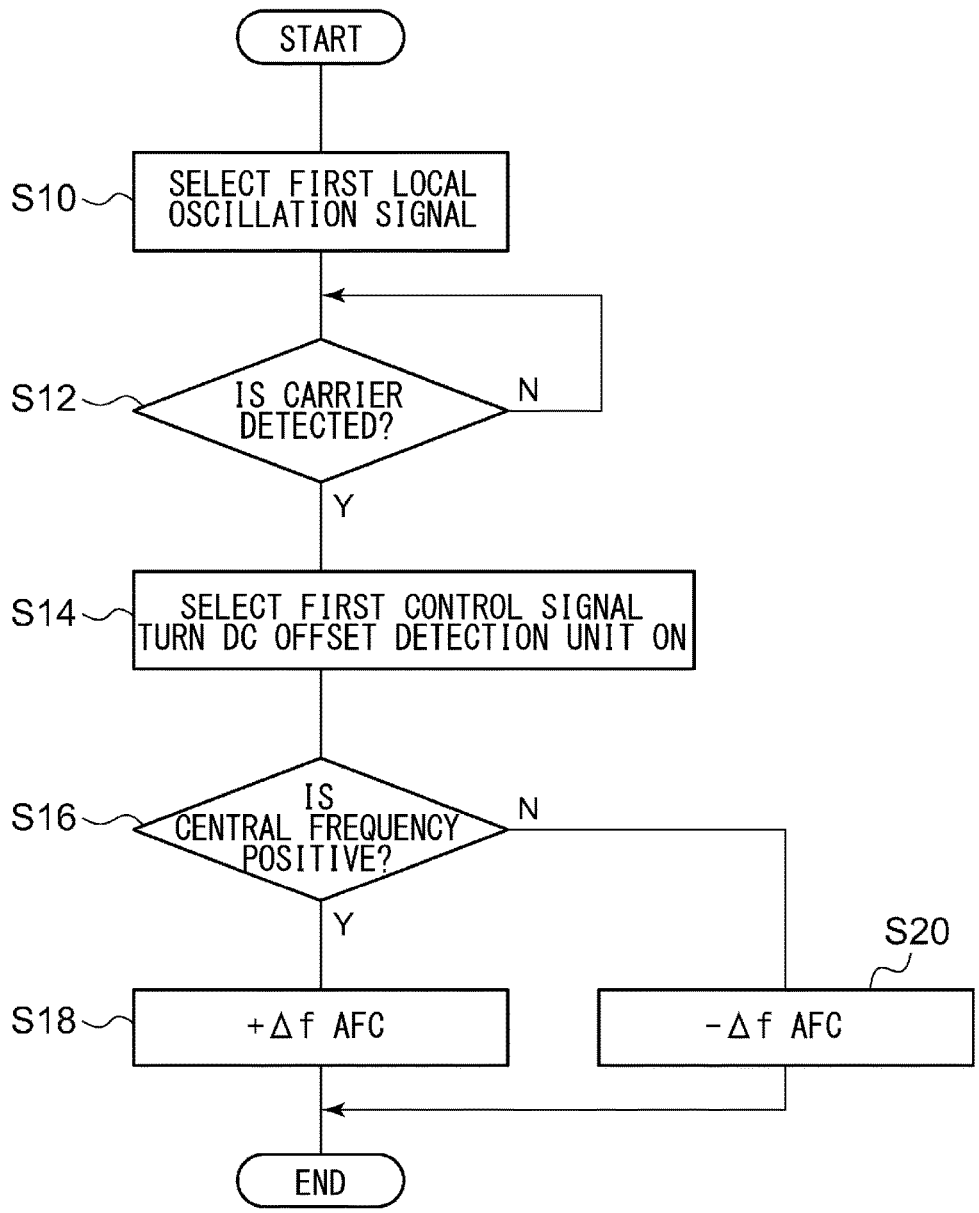
FIG. 6 is a flowchart showing the steps of control by the reception device of FIG. 5.

A description will now be given of the operation of the reception device 100 having the configuration described above. FIG. 6 is a flowchart showing the steps of control by the reception device 100. The selection unit 96 selects the first local oscillation signal (S10). If the control unit 94 does not detect a carrier (N in S12), the system stands by. If the control unit 94 detects a carrier (Y in S12), the selection unit 96 selects the first control signal and the DC offset detection unit 22 is turned on (S14). If the central frequency of the received signal is positive (Y in S16), the AFC unit 66 effects $+\Delta f$ AFC control (S18). Meanwhile, if the central frequency of the received signal is not positive (N in S16), the AFC unit 66 effects $-\Delta f$ AFC control (S20).

According to this embodiment, the second local oscillation signal subjected to FM modulation is output when an RF signal is not received. Therefore, the I-signal and the Q-signal are prevented from being locked to a constant value even if an unmodulated signal having the same frequency as the frequency of the second oscillation signal is received. Since the I-signal and the Q-signal are not locked to a constant value, the base band signal is prevented from being completely suppressed. Further, the first control signal is output when an RF signal is received. Therefore, the demodulated signal is prevented from containing unnecessary signal even if the oscillation frequency of the second local oscillation signal is within the demodulation band.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An FM reception device comprising:
a local oscillator that outputs a local oscillation signal;
a quadrature detection unit that subjects an FM signal to quadrature detection using the local oscillation signal output from the local oscillator and outputs an I-phase base band signal and a Q-phase base band signal;
a correction unit that corrects the I-phase base band signal and the Q-phase base band signal output from the quadrature detection unit using a DC offset correction value;
a DC offset detection unit that subjects the I-phase base band signal and the Q-phase base band signal corrected by the correction unit to rectangular to polar conversion and derives the DC offset correction value such that amplitudes in a plurality of phase domains defined in an IQ plane approximate each other;
an FM detection unit that subjects the I-phase base band signal and the Q-phase base band signal corrected by the correction unit to FM detection and generates a detection signal;
an addition unit that adds an offset to the detection signal generated in the FM detection unit;
an automatic frequency control (AFC) unit that generates a control signal for controlling a frequency of the local oscillation signal based on the detection signal to which the offset is added in the addition unit and feeds back the control signal to the local oscillator;
a modulation frequency generation unit that generates a modulation signal of a predetermined frequency;
a selection unit provided between the AFC unit and the local oscillator, the selection unit receiving the control signal from the AFC unit as a first control signal, receiving the modulation signal from the modulation frequency generation unit, selecting one of the first control signal and the modulation signal as a second control signal, and outputting the selected second control signal to the local oscillator; and
a control unit that generates a selection signal indicating a signal that should be selected in the selection unit, based on the detection signal generated in the FM detection unit, wherein the control unit includes a means to detect a carrier in the detection signal generated in the FM detection unit, the control signal generating the selection signal that causes the first control signal to be selected when the carrier is detected and causes the modulation signal to be selected when the carrier is not detected.

2. An FM reception method comprising:
subjecting an FM signal to quadrature detection using a local oscillation signal output from a local oscillator and outputting an I-phase base band signal and a Q-phase base band signal;
correcting the I-phase base band signal and the Q-phase base band signal using a DC offset correction value;
subjecting the I-phase base band signal and the Q-phase base band signal corrected to rectangular to polar conversion and deriving the DC offset correction value such that amplitudes in a plurality of phase domains defined in an IQ plane approximate each other;
subjecting the corrected I-phase base band signal and the corrected Q-phase base band signal to FM detection and generating a detection signal;
adding an offset to the detection signal generated;
generating a control signal for controlling a frequency of the local oscillation signal based on the detection signal to which the offset is added; generating a modulation signal of a predetermined frequency;
selecting one of the control signal and the modulation signal according to a selection signal generated based on the detection signal and outputting the selected signal to the local oscillator; and
detecting a carrier in the detection signal, wherein the selection signal causes the control signal to be selected when the carrier is detected and causes the modulation signal to be selected when the carrier is not detected.

* * * * *